United States Patent [19]
Gilmore et al.

[11] Patent Number: 5,943,432
[45] Date of Patent: Aug. 24, 1999

[54] POSTAGE DUE DETECTION SYSTEM

[76] Inventors: Jack R. Gilmore, 19201 N. 17th Dr., Phoenix, Ariz. 85027; Neil D. Graves, 3525 E. Ludlow Dr., Phoenix, Ariz. 85032

[21] Appl. No.: 08/154,167

[22] Filed: Nov. 17, 1993

[51] Int. Cl.[6] .................................................. G06K 9/00
[52] U.S. Cl. ........................................ 382/101; 209/584
[58] Field of Search .............................. 382/1, 7, 12, 61, 382/101, 102, 183, 317; 364/464.02; 283/70, 71; 235/462, 470, 487, 499; 902/11; 209/584; 705/401, 405, 408, 406

[56] References Cited

U.S. PATENT DOCUMENTS

| | | | |
|---|---|---|---|
| 4,864,618 | 9/1989 | Wright et al. | 380/51 |
| 4,868,757 | 9/1989 | Gil | 364/464.03 |
| 4,900,904 | 2/1990 | Wright et al. | 235/381 |
| 4,940,887 | 7/1990 | Sheng-Jung | 235/381 |
| 5,122,967 | 6/1992 | Gilham | 364/479 |
| 5,149,139 | 9/1992 | Kaule | 283/70 |
| 5,267,754 | 12/1993 | Kaule | 283/71 |
| 5,319,562 | 6/1994 | Whitehouse | 364/464.03 |

*Primary Examiner*—Andrew W. Johns
*Attorney, Agent, or Firm*—Gregory J. Nelson

[57] ABSTRACT

A coded postal stamp which carries machine readable indicia representative of a minimum postal denomination. The indicia may be in the form of a UPC code, special inks which can be scanned or specially placed numerals which are easily optically read. The method of the invention includes the steps of scanning postal material such as first class letters previously sorted, and detecting the presence of the coded stamp. Postal material having less than a predetermined denominational amount are rejected.

2 Claims, 2 Drawing Sheets

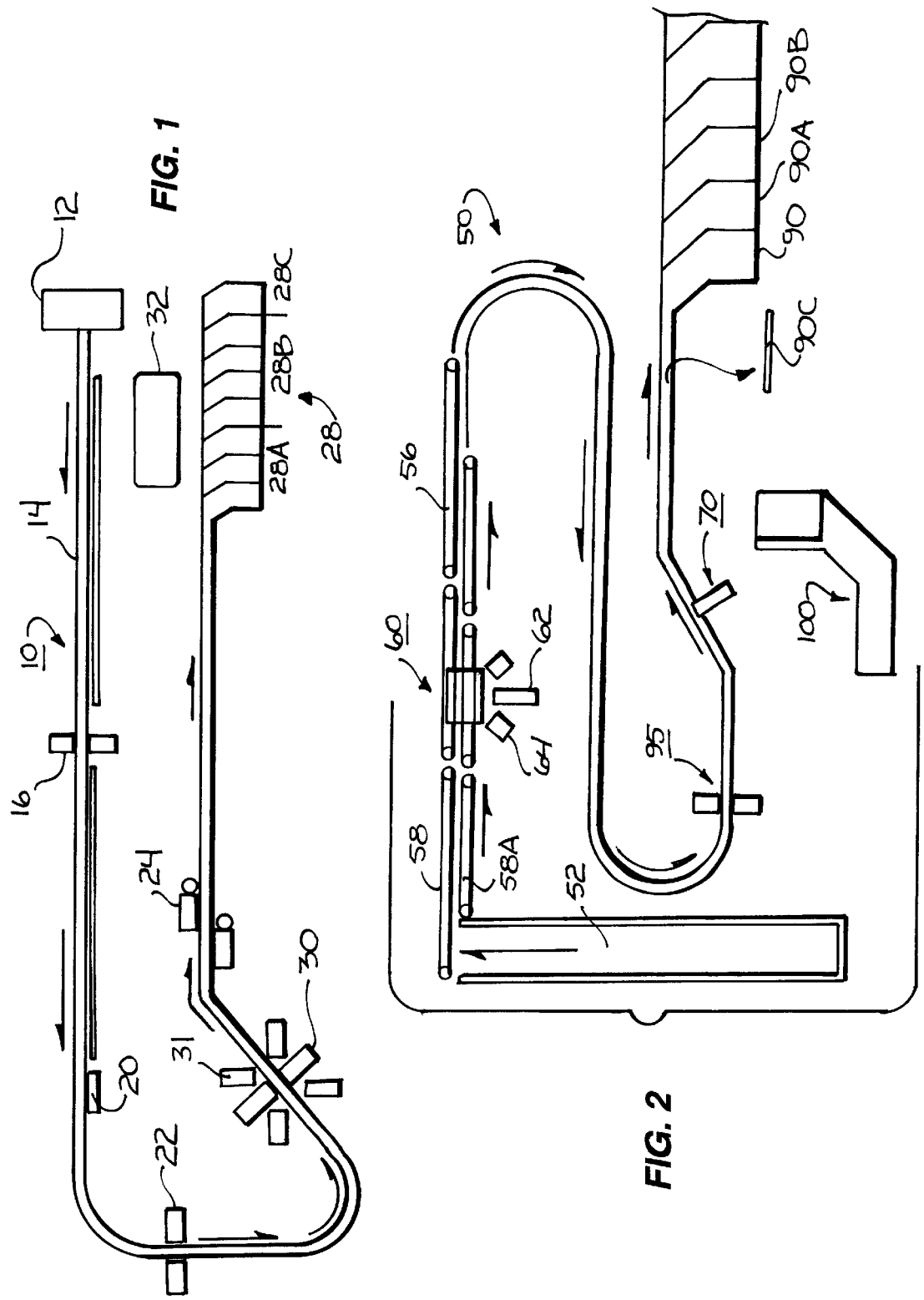

POSTAGE DUE DETECTION SYSTEM

The present invention provides a system for determining whether a pre-selected, minimum amount of postage has been applied to posted material and further relates to a stamp encoded so the stamp can be optically or electronically scanned or read to determine whether the postage applied to the material is below a pre-determined minimum amount.

The United States Postal system handles an increasing volume of mail. Presently, it is estimated that the U.S. Postal Department dispenses approximately forty billion stamps per year and to accommodate this large mail volume, automatic mail processing devices and systems are widely utilized to perform the sorting, piling, picking up, labeling and bundling procedures necessary.

While many of the automated systems presently being utilized for mail sorting and for other applications in which similar items are processed have means for determine whether postage is applied, none are believed to optically or electronically determine the amount of postage applied. Present estimates are that as many as five hundred to six hundred million pieces of mail a day are processed and many carry either no postage or insufficient postage. Postal practice is to place the responsibility on the route carrier to detect insufficient postage. Thus, many mail pieces pass through the automated processing of the postal department with insufficient or no postage thereon resulting in either additional work at the carrier level and/or substantial revenue losses to the postal department.

A survey of the patent literature indicates the following patents which relate to and are representative of current automatic mail processing apparatus and systems.

U.S. Pat. No. 4,516,209 discloses a postage metering system having a scale to check the weight of items to be mailed and further including the apparatus for printing postage and a scale for determining if the weight of the item is within a predetermined range of weights so the printing apparatus may print only if the weight of the item is within the range.

U.S. Pat. No. 4,627,540 describes an automatic mail processing apparatus having a mail reject mechanism disposed between a reading and sorting unit and labeling unit. The reading and sorting machine reads-out postal codes of the individual pieces and stores the read-out data in memory and piles the mail in selected sorting boxes. Labeling apparatus prints a bar code on the label and attaches a label to the mail pile.

U.S. Pat. No. 4,923,022 discloses an automatic mailing apparatus having a transfer device, a weighing device, a stamping device, a detecting device and a collecting device. A letter to be mailed is inserted into the device through the letter insertion and retrieval slot and is automatically transferred for weighing, stamping and sorting.

U.S. Pat. No. 4,736,441 discloses a postal material reading apparatus provided with a mechanism for obtaining an image signal which represents a visual image of the surface of the posted material. The purpose is to accurately determine the reverse/obverse of postal material and determine whether the postal material is right-side-up or up-side-down, in spite of partial overlapping of an edge mark with marks which are critical to these determinations.

U.S. Pat. No. 4,998,626 describes a mail processing machine for sorting the mail according to whether the characters of the destination address are printed or hand-written. The mail processing machine reads information on the surface of the mail and distinguishes the area of the destination address from the area of the sender address. The machine has a recognizer to determine printed or handwritten addresses according to dispersion. The recognizer calculates the dispersion using the signals corresponding to the bottom lines of the address area which contains important information.

U.S. Pat. No. 4,715,622 discloses a postal decal or stamp that carries a separable part which is available for entering the destination identifier such as a zip code. The identifiers are written to be machine readable at postal centers where mail is sorted and processed.

Thus, while the foregoing patents are representative of postal handling, weighing and sorting machines, they do not adequately deal with the problem of detecting postal material with insufficient postage.

Briefly, the present invention provides a processing system in which postal material is scanned using automatic equipment to determine whether the postal material has at least a minimum predetermined amount of postage affixed. In accordance with the present invention, a postal stamp or decal is provided in various denominations having the usual decorative and informational indicia on one side and an adhesive on the other. The stamp also includes encoding so that the stamp may be scanned or read to determine the postage denomination represented by the stamp. The encoding may be in the form of a symbol similar to UPC symbols or other symbolic coding. The code may also be in the form of special ultraviolet inks or color inks which can be machine read or scanned. In another form of the invention, the indicia representing the postage amount is placed in an area free of background so as to allow optical scanning without background interference.

BRIEF DESCRIPTION OF DRAWINGS

The above and other objects and advantages of the present invention will be better understood from the following detailed description taken in conjunction with the accompanying figures of the drawings in which:

FIG. 1 is a schematic diagram of a representative system for sorting mail, the system including stations for scanning first class mail for the presence of a stamp and canceling apparatus. The machine also orients letters for subsequent processing;

FIG. 2 is a diagram of another system commonly used for sorting mail by indicated destination;

Figure 4:
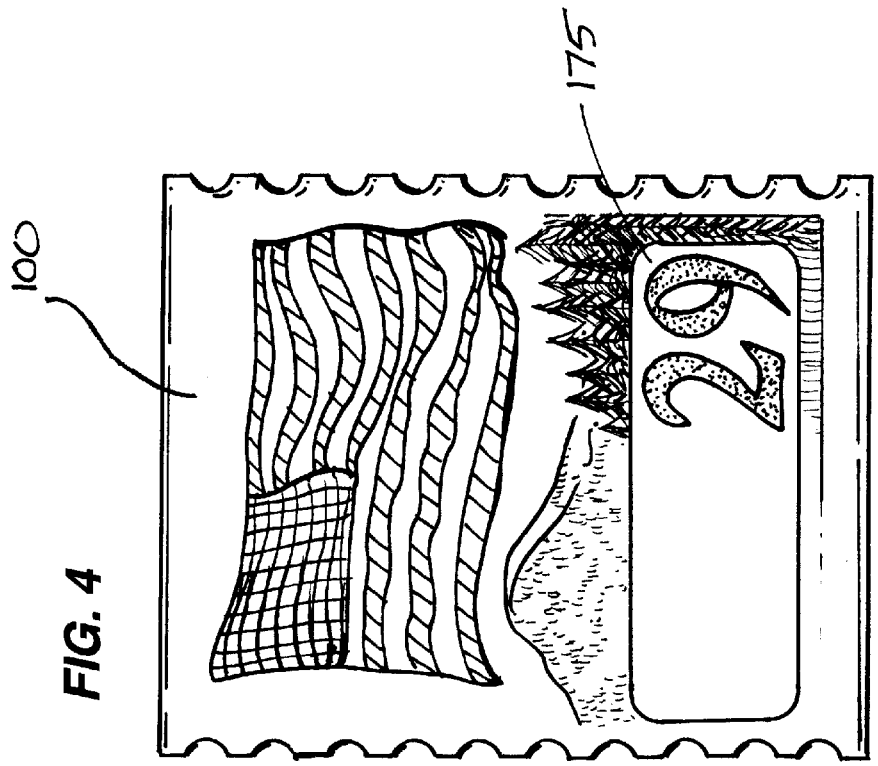
FIG. 4 is a front view of a stamp having an area free of interfering background in which denomination indicia appears.

The present invention relates to a specially encoded stamp or decal, however, an understanding of the nature of mail processing systems will assist in understanding the present invention and also clearly illustrate the adaptability of the present invention to processing systems presently in use.

In FIG. 1, a system is shown which is generally designated by the numeral 10 and which has an incoming or loading area 12 in which incoming postal material to be processed are introduced. Systems of this type are used to orient, cancel and sort mail usually first class letter mail. Generally some pre-sorting is done either manually or by automation in which letters, particularly first class letters, are sorted for separate processing. The conveyor 14 may be a belt conveyor and generally moves the letters in a vertical end-to-end path. The letters are carried along conveyor 14 past a first station 16 which includes ultraviolet readers 16. The ultraviolet readers 16 sense the presence of a stamp. As the mail continues along it passes station 20 where letters on which a stamp has not been detected are flipped over based on the assumption that the absence of a stamp was due to the fact that the letter was improperly oriented. The letters then continue along the conveyor and past ultraviolet readers located at station 22. The mail is now in vertical, end-to-end relationship and all bearing stamps should carry the stamp on along the upper portion of the envelope. If no stamp is detected, those letters will be rejected. The system does not verify the denomination of the stamp, only the presence of a stamp.

The letters continue from station 22 to station 24 which cancels the stamps. Canceling devices are located on both sides of the conveyor. The stamps are then directed to a sorter 28 having a plurality of bins or chutes 28A, 28B, 28C. The envelopes, oriented with the stamp disposed toward the front or leading edge of the envelope as they pass through the system, are directed into chutes 28A whereas those envelopes with the stamps located toward the rear or trailing edge of the envelopes as they pass through the system are shunted to chutes or bins 28B. This sorting places the mail in proper order and arrangement for subsequent processing.

With the present invention, a reader unit 30 is located at a suitable location along the conveyor route. Preferably, the reader is located ahead of the canceling station 24 so cancellation marks will not interfere with the reading or scanning of the stamps. The reader may include lights 31 to enhance the operation. The reader, as will be more fully explained hereafter, detects the minimum amount of postage on the envelope. For example, under current postal rates, a minimum postage amount of 29¢ is required for first class mail. The reader 30 determines if the stamp on the envelope is at least a stamp of this denomination. If it is, the envelope is deposited in one of the bins 28A or 28B depending on stamp position. If the stamp is of a denomination less than 29¢, it would be directed to the reject bin 28C. The computer 32 is programmed to direct the mail to the proper bin. Sorting machines of this general type are known as, for example, the machines manufactured by Electrocom Automation LP. Also, readers of various types, such as optical scanners and ultraviolet or spectrographic sensors are also known to those skilled in the art.

The readers at station 16 sense only the presence of a stamp for purposes of orientation of the mail and do not determine the acceptability of the amount of postage. The reader 30 reads to determine that a minimum acceptable postal amount is present. The reader 30 may be an optical reader, a UV detector and in the preferred embodiment is a UPC reader located to scan to UPC labels on the postal material. The symbol read by the reader is transmitted to a computer 32 which controls the operation of the sorting unit 28.

FIG. 2 is illustrative of another type of conventional mail processing system 60 with which the postage due detection system of the present invention is compatible. In FIG. 2, the system is used primarily to destination sort previously processed and canceled mail and illustrates that the present invention is applicable to both various sorting systems and sorting and processing stages. The incoming mail is introduced into the system 60 at 50 by means of a letter shaker 52 which is manually or automatically loaded with incoming mail. The mail is picked up by a conveyor 56 and the letters are moved along the conveyor by a plurality of belts 58, 58A located on opposite sides of the conveyor. The mail is first directed to station 60 which includes an optical reader 62 and lights 64. The optical reader at station 60 reads or detects the destination address on the piece of mail and generates a signal representative of the destination address. The reader is capable of reading both printed and typewritten addresses with a special program for reading most handwritten addresses. Normally the address location is determined by zip code. If a zip code appears on the envelope, a bar code marker at station 70 will imprint the appropriate bar code on the letter. The bar code marker is operatively controlled from a remote computer which receives a signal from the optical reader 62. After bar code marking at station 70, the letters are appropriately sorted by zip code areas in bins 90, 90A, etc. Any number of bins may be provided, typically as many as 100 separate bins can be provided. The mail is then distributed to the carrier routes. The control of the system is monitored by program station 100.

In accordance with the present invention, an additional reader can be installed at any suitable location such as at station 95. The reader at station 95 scans the mail as it passes by and if postage of at least a predetermined amount is not detected, the letters are automatically shunted to the reject bin 90C. The reader may be an optical reader, UV detector or electronic sensor or bar code reader depending on the type of encoding used on the stamps. A plurality of readers detecting different signals may also be provided at station 95.

Figure 3:
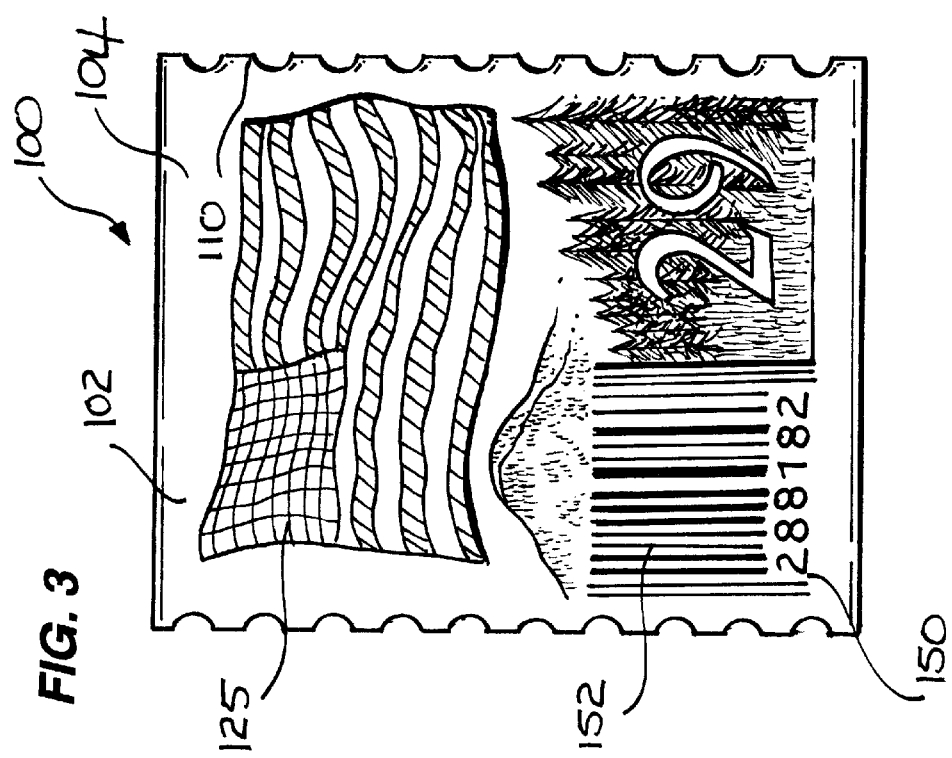
FIG. 3 is a front view of a stamp bearing UPC coding.

Referring to FIG. 3, a representative postage stamp 100 is shown and encoded with information representative of the denomination of the stamp. The stamp is a decal having a front surface 102 and a rear surface 104 and may be any geometric shape and is shown as being generally rectangular. The rear surface 104 is provided with a soluble adhesive coating which allows the stamp to be easily affixed to the postage material, usually in the upper right hand corner of the postal material. As is customary, the stamps are wetted before fixation to the surface of the postal material. Alternatively, the stamps may be provided on a backing and peeled off when used. This type of stamp is self-adhering. The stamps are generally provided in sheets or rolls with perforations or separation lines 110 between adjacent stamps for convenience of separation at time of use.

The front surface of the stamp has any appropriate decorative indicia 125 which is shown as a flag, and additional indicia representing the country of issuance and the denomination of the stamp also appears. The particular artwork, design or indicia may, of course, vary.

The stamp is encoded in area 150 with UPC code 152 which is representative of the denomination of the stamp. Thus, the UPC code facilitates quick and convenient determination of the denomination of the stamp while it is being processed through one of the systems, such as representative systems shown in FIGS. 1 and 2. If there is an aesthetic objection to placement of a visible bar or UPC code on the surface of the stamp, other detection encoding means are available.

An alternate version is shown in FIG. 4 in which the stamp is configured having a substantial area 175 on the front surface devoid of any background. The denomination of the stamp, in this case 29¢, appears in this area. This area 175, which is shown as comprising about ⅛th to ¼th the surface area of the stamp is devoid of any other background or other printed material which would interfere with optical reading of the 29¢ denomination indication.

Alternatively, the stamps may also be printed with special inks in which as for example the denomination is printed in ink having ultraviolet characteristics which may be detected by a compatible reader. Certain specialized colors could also be used. For example, inks of certain colors could be used for specified denominations of stamps. The stamp denomination could then be easily determined by spectrographic analysis as the wave length of reflected light would then indicate the stamp denomination. For example, stamps with inks which radiate within certain specified wavelengths under spectrographic analysis would indicate a denomination of, for example, 29¢. The reader would be a spectrograph or other spectrum measuring device.

Thus, it will be seen from the foregoing, the present invention prevents a stamp or decal which, in the normal processing of the mail, permits the denomination of the stamp to be automatically detected. Thus, individuals, for example, placing a 1¢ on an ordinary first class letter to avoid paying additional postage would be discouraged. The burden of handling postage due letters on a manual rather than an automated basis would be substantially lessened. The ultimate savings to the Post Office department and to consumers could be substantial.

It will be obvious that while the present invention has been described with respect to postage stamps, the system would have application to other processes where some type of denomination decal or label are affixed to bulk materials.

It will be apparent to those skilled in the art that various modifications and variations may be made to the apparatus and method of this invention without departing from the spirit and scope of the appended claims. The present invention covers such modifications and variations which are within the scope of the appended claims and their legal equivalents.

We claim:

1. A mail processing system for mail pieces comprising:
   (a) providing a stamp with a bar code thereon representative of a postage denomination for application to a mail piece by the postal user at a postal bearing area;
   (b) affixing said stamp to said mail piece;
   (c) collecting and depositing the stamp-bearing mail piece;
   (d) initially sorting so that mail pieces of a similar class are commonly grouped;
   (e) orienting the mail pieces so the postal-bearing areas are aligned;
   (f) automatically scanning the bar codes on the mail pieces with a machine reader to determine whether a minimum denomination of postage is affixed; and
   (g) rejecting the postage material having a stamp below a postage denomination from the processing line.

2. The system of claim 1 including illuminating the mail pieces to enhance the scanning of the mail pieces.

* * * * *